(12) United States Patent
Melson et al.

(10) Patent No.: US 10,369,943 B2
(45) Date of Patent: Aug. 6, 2019

(54) IN-VEHICLE INFOTAINMENT CONTROL SYSTEMS AND METHODS

(71) Applicant: Ford Global Technologies, LLC, Dearborn, MI (US)

(72) Inventors: Andre Aaron Melson, Fremont, CA (US); John Michael Galan Ferrer, Carson, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 66 days.

(21) Appl. No.: 15/621,719

(22) Filed: Jun. 13, 2017

(65) Prior Publication Data

US 2018/0354433 A1 Dec. 13, 2018

(51) Int. Cl.
*B60R 16/023* (2006.01)
*H04M 1/725* (2006.01)
*H04M 1/60* (2006.01)

(52) U.S. Cl.
CPC ....... *B60R 16/023* (2013.01); *H04M 1/72577* (2013.01); *H04M 1/6083* (2013.01); *H04M 1/72569* (2013.01); *H04M 1/72572* (2013.01)

(58) Field of Classification Search
CPC ............ B60R 16/023; H04M 1/72572; H04M 1/72577; H04M 1/72569; H04M 1/6083

USPC ........................................................... 701/2
See application file for complete search history.

(56) References Cited

U.S. PATENT DOCUMENTS

| | | | |
|---|---|---|---|
| 8,740,301 B2 | 6/2014 | Liu | |
| 9,224,289 B2 | 12/2015 | Demeniuk | |
| 9,326,089 B2 | 4/2016 | Xia | |
| 9,348,492 B1 | 5/2016 | Penilla | |
| 9,477,332 B2 | 10/2016 | Cuddihy | |
| 2014/0163774 A1* | 6/2014 | Demeniuk | G08C 17/02 701/2 |
| 2016/0065646 A1* | 3/2016 | Tonshal | H04L 67/025 701/2 |
| 2016/0263996 A1 | 9/2016 | Gerlach | |
| 2016/0270144 A1 | 9/2016 | Thanayankizil | |
| 2017/0147137 A1* | 5/2017 | Schunder | B60K 35/00 |
| 2018/0041628 A1* | 2/2018 | Shannir | H04M 1/72577 |

* cited by examiner

*Primary Examiner* — Brian P Sweeney
(74) *Attorney, Agent, or Firm* — David R. Stevens; Stevens Law Group

(57) ABSTRACT

Example in-vehicle infotainment control systems and methods are described. In one implementation, a method receives a request from a mobile device to control an in-vehicle infotainment (IVI) system of a vehicle. The method determines whether a speed of the vehicle exceeds a threshold and whether the mobile device is operated by a passenger of the vehicle. If the vehicle's speed exceeds the threshold and the mobile device is operated by a passenger, the mobile device is allowed to control the IVI system.

18 Claims, 5 Drawing Sheets

IN-VEHICLE INFOTAINMENT CONTROL SYSTEMS AND METHODS

TECHNICAL FIELD

The present disclosure relates to vehicular systems and, more particularly, to systems and methods that control an infotainment system of a vehicle.

BACKGROUND

Automobiles and other vehicles provide a significant portion of transportation for commercial, government, and private entities. Additionally, modern vehicles perform many functions beyond basic transportation. For example, vehicles may include sound systems, climate control systems, navigation systems, entertainment systems, interfaces to mobile devices, communication systems that communicate with devices and systems outside the vehicle, and the like. These additional functions may be accessible to a driver or passenger in the vehicle.

In some situations, a driver is prevented from making certain changes to navigation systems and other systems while the vehicle is in motion. This restriction is intended to reduce driver distractions when the vehicle is being operated by the driver. However, it may be desirable to allow a passenger in the vehicle to make changes to navigation systems and other systems in the vehicle.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
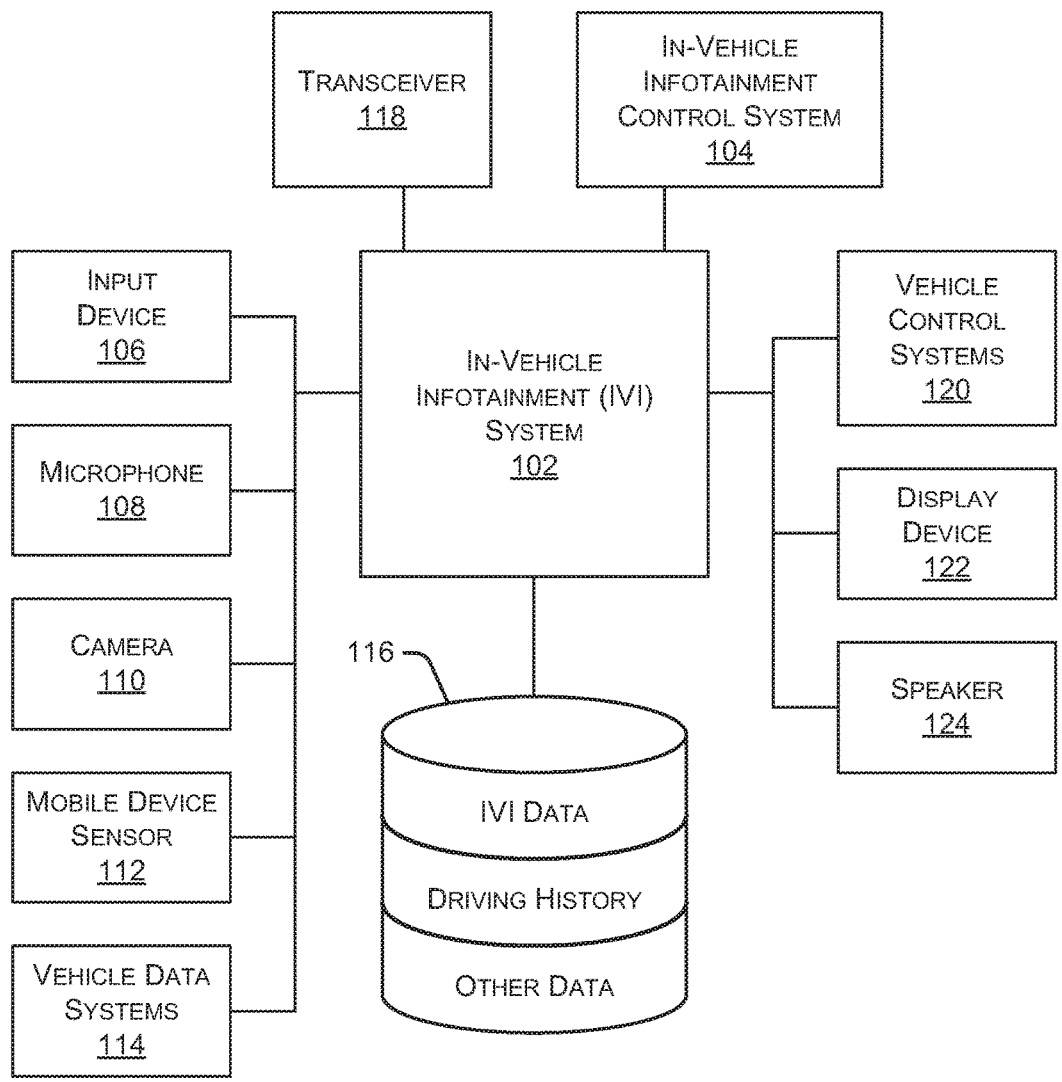
FIG. 1 is a block diagram illustrating an embodiment of various vehicle systems that include an in-vehicle infotainment control system.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessorbased or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed herein may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure are directed to computer program products comprising such logic (e.g., in the form of software) stored on any computer useable medium. Such software, when executed in one or more data processing devices, causes a device to operate as described herein.

FIG. 1 is a block diagram illustrating an embodiment of various vehicle systems that include an in-vehicle infotainment (IVI) system 102 and an IVI control system 104. IVI system 102 may also be referred to as an in-car entertainment system. IVI system 102 controls a variety of vehicle systems and supports user interaction to control those vehicle systems. For example IVI system 102 may control (and allow user interaction related to) a vehicle sound system, a climate control system, a navigation system, an entertainment system, a communication system, and the like. IVI control system 104 allows a separate device, such as a mobile device operated by an occupant of a vehicle, to control various functions supported by IVI system 102, as discussed herein. Although IVI control system 104 is shown as a separate component in FIG. 1, in alternate embodiments, IVI control system 104 may be incorporated into IVI system 102 or any other vehicle component.

IVI system 102 interacts with other vehicle systems and components, such as to receive user input and receive other data associated with the vehicle and its occupants. For example, IVI system 102 receives user input from one or more input devices 106, such as a touch screen, physical interface buttons, and the like. IVI system 102 also receives user input and other auditory data from one or more microphones 108. For example, a user may provide voice commands to IVI system 102 through microphone 108. Additionally, IVI system 102 may receive other auditory data related to sounds inside the vehicle through microphone 108.

IVI system 102 also receives image data from one or more cameras 110. Camera 110 may be located inside the vehicle to capture image data associated with the vehicle's interior, or may be located outside the vehicle to capture image data associated with the area surrounding the exterior of the vehicle. For example, camera 110 can determine where occupants are located within the vehicle, such as the seating position of each occupant. Additionally, IVI system 102 receives data from one or more mobile devices sensors 112. Mobile device sensor 112 may sense the presence of one or more mobile devices inside the vehicle.

IVI system 102 also receives information from one or more vehicle data systems 114, such as data repositories, a CAN (Controller Area Network) bus, and the like. In some embodiments, the information received from vehicle data systems 114 include the current speed of the vehicle. IVI system 102 is also coupled to a data store 116 for storing relevant or useful data for operation of IVI system 102, such as IVI data related to settings and user profiles, map data, driving history, or other data. IVI system 102 may also be coupled to a transceiver 118 for wireless communication with a mobile or wireless network, other vehicles, infrastructure, or any other communication system. In some embodiments, transceiver 118 communicates with one or more mobile devices within the vehicle.

IVI system 102 may be further coupled to one or more vehicle control systems 120 that control various vehicle functions, such as braking, steering, and the like. IVI system 102 may also include one or more displays 122, speakers 124, or other devices so that notifications to a human driver or passenger may be provided. Display 122 may include a heads-up display, dashboard display or indicator, a display screen, or any other visual indicator, which may be seen by a driver or passenger of a vehicle. Speakers 124 may include one or more speakers of a sound system of a vehicle or may include a speaker dedicated to driver or passenger notification.

It will be appreciated that the embodiment of FIG. 1 is given by way of example only. Other embodiments may include fewer or additional components without departing from the scope of the disclosure. Additionally, illustrated components may be combined or included within other components without limitation.

Figure 2:
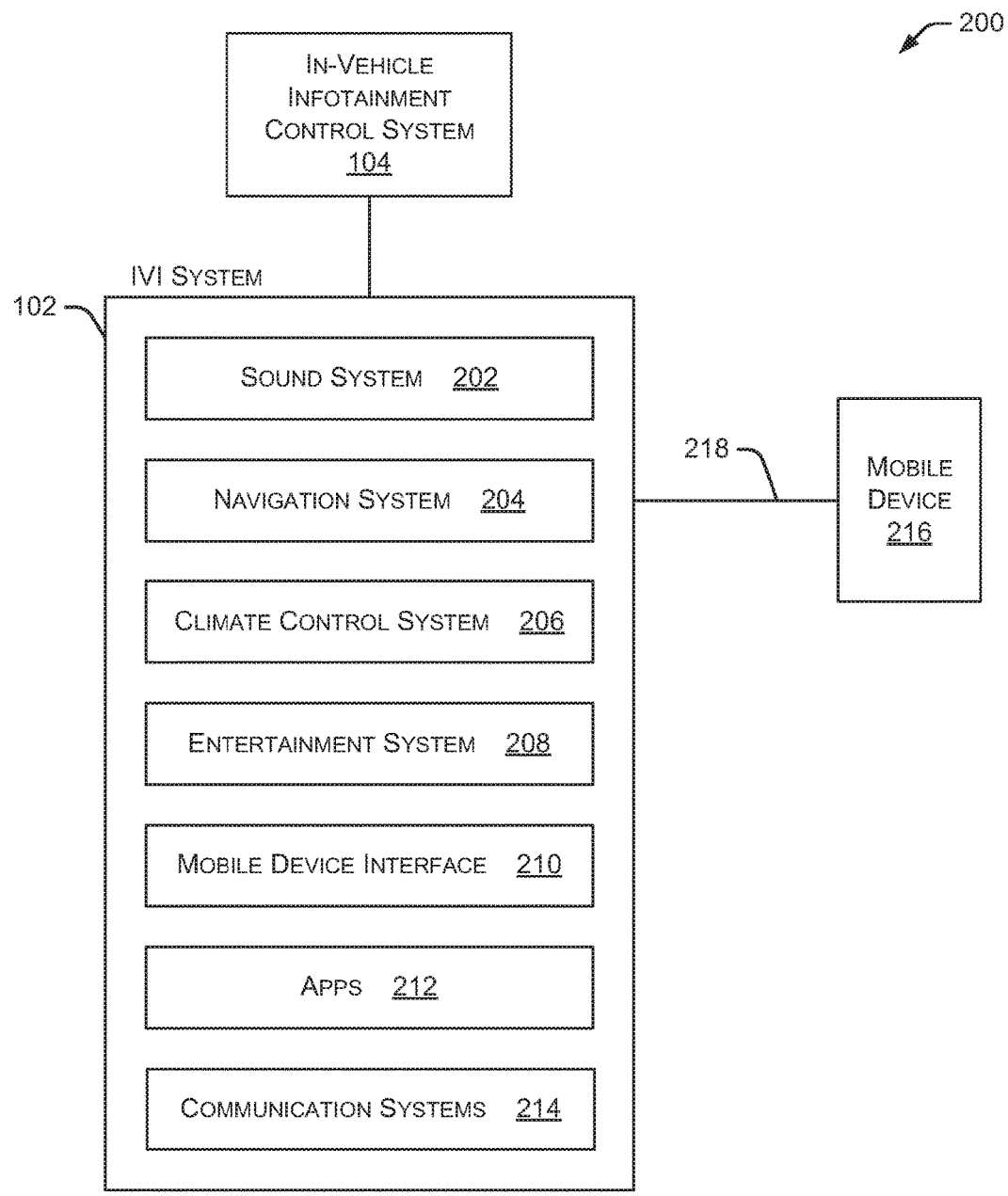
FIG. 2 is a block diagram illustrating an embodiment of an in-vehicle infotainment system and associated control system.

FIG. 2 is a block diagram illustrating an embodiment 200 of IVI system 102 and associated IVI control system 104. As shown in FIG. 2, IVI system 102 communicates with various systems and components within the vehicle to support the functionality provided by IVI system 102. For example, IVI system 102 interacts with a sound system 202, a navigation system 204, a climate control system 206, and an entertainment system 208. Blocks 202-208 shown in FIG. 2 represent interaction with these systems—the specific systems themselves are typically located separate from (but coupled to) IVI system 102. In some embodiments, one or more vehicle occupants (e.g., a driver and/or a passenger) may interact with IVI system 102 to control sound system 202, navigation system 204, climate control system 206, or entertainment system 208. As discussed herein, a particular vehicle occupant may interact with IVI system 102 using a mobile device 216 that is in wireless (or wired) communication with IVI system 102 via communication link 218. Mobile device 216 includes any type of mobile computing device, such as a tablet, a smartphone, a notebook computer, a handheld computer, a laptop computer, and the like. In some embodiments, communication link 218 is a WiFi communication link, Bluetooth communication link, or any other wireless communication link. In other embodiments, communication link 218 includes a physical cable connecting mobile device 216 to IVI system 102.

IVI system 102 also includes a mobile device interface 210 that communicates, for example, with mobile device 216 to receive IVI commands from the user of mobile device 216. Additionally, IVI system 102 includes one or more apps (i.e., applications) 212 that perform various functions, such as the functions and operations discussed herein. One or more communication systems 214 support communication between IVI system 102 and other systems located inside or outside the vehicle. For example, communication systems 214 may receive vehicle data, such as vehicle speed, from other vehicle systems.

Figure 3:
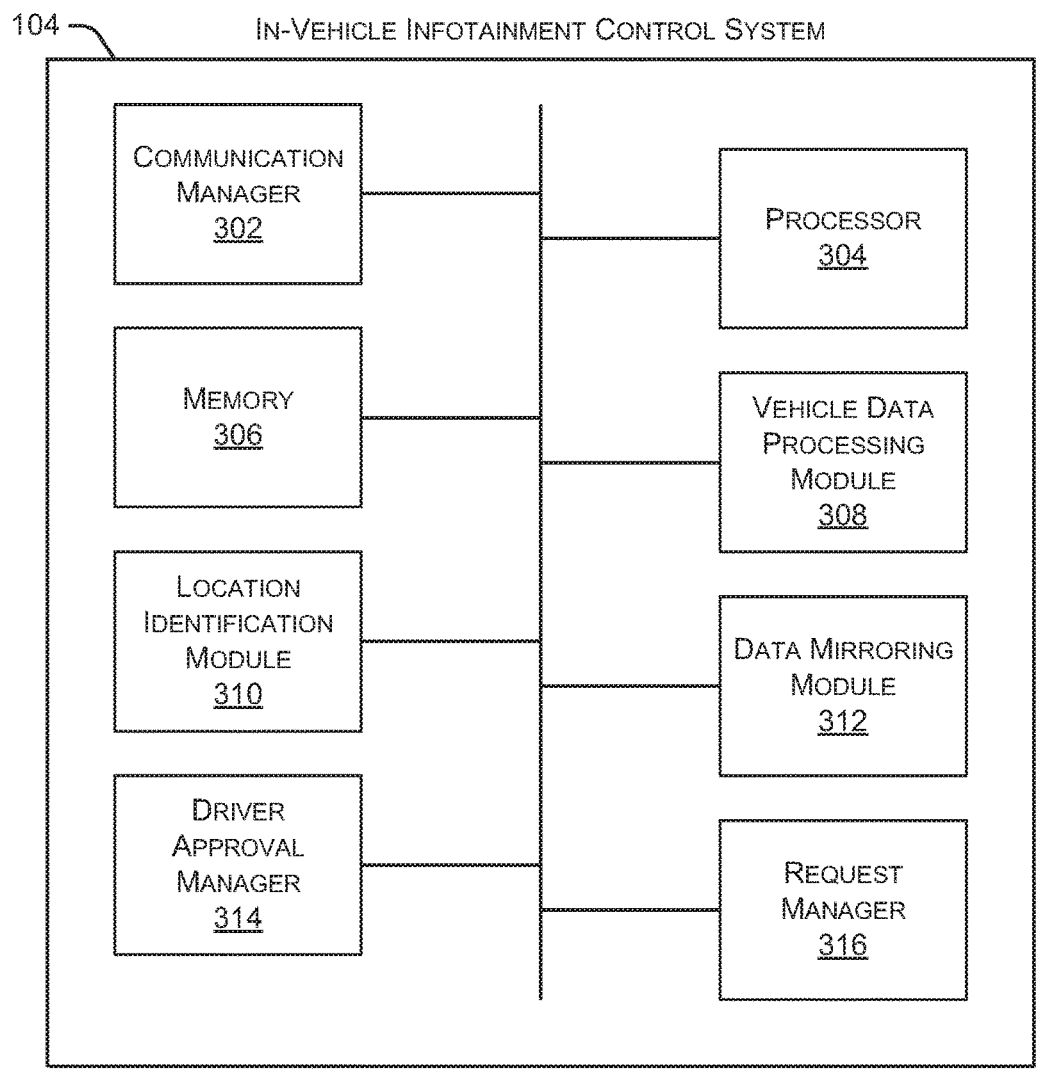
FIG. 3 is a block diagram illustrating an embodiment of the in-vehicle infotainment control system.

FIG. 3 is a block diagram illustrating an embodiment of IVI control system 104. As shown in FIG. 3, IVI control system 104 includes a communication manager 302, a processor 304, and a memory 306. Communication manager 302 allows IVI control system 104 to communicate with other systems, such as IVI system 102, as discussed herein. Processor 304 executes various instructions to implement the functionality provided by IVI control system 104, as discussed herein. Memory 306 stores these instructions as well as other data used by processor 304 and other modules and components contained in IVI control system 104.

Additionally, IVI control system 104 includes a vehicle data processing module 308 that receives vehicle data from one or more vehicle sensors, vehicle systems, CAN bus, and the like. In some embodiments, vehicle data processing module 308 receives data associated with the vehicle's current speed from a vehicle sensor, vehicle system, or CAN bus. As discussed herein, the vehicle's current speed is used in determining whether a driver of the vehicle is permitted to interact with IVI system 102.

A location identification module 310 determines the location of a mobile device and/or an occupant within the vehicle. For example, location identification module 310 can determine whether a particular mobile device is being operated by an occupant in a passenger seat or by an occupant in a driver's seat. Various systems may be used to determine a location of the mobile device within the vehicle. In some embodiments, different audio signals are sent from the vehicle's speakers and received by the mobile device. Based on the received audio signals, the mobile device can determine its location within the vehicle (e.g., whether the device is located in a passenger seating area or a driver seating area). That location determination is then communicated to location identification module 310. In other embodiments, the received audio signals are sent from the mobile device to location identification module 310 for processing.

In alternate embodiments, other types of systems and techniques may be used to determine the location of the mobile device within the vehicle. For example, a mobile device may be "tethered" to a passenger door using a cable (e.g., a USB communication cable) with a specific length that prevents the mobile device from being used by the driver. In some embodiments, the location of the mobile device within the vehicle can be determined using an RFID reader (or other type of ID reader) located in each passenger location such that only mobile devices within a limited range of the RFID reader would be sensed.

If the mobile device is requesting access to the vehicle's IVI system while the vehicle is moving, the driver may be restricted from accessing the IVI system because it's a distraction to driving the vehicle. Thus, location identification module 310 determines the location of the mobile device. If the mobile device is being operated by an occupant in a passenger seat, the system may allow that mobile device to access and interact with the IVI system while the vehicle is moving. Additional details related to providing IVI system access to a mobile device are discussed herein.

IVI control system 104 also includes a data mirroring module 312 that mirrors data from IVI system 102 on a mobile device. For example, the current display on IVI system 102 may be mirrored (i.e., copied) on the mobile device display such that a user of the mobile device can interact with IVI system 102 using the mirrored data on the mobile device display. Data mirroring module 312 manages the communication of data and user inputs between IVI system 102 and the mobile device. In some embodiments, an application (also referred to as an "app") installed on the mobile device communicates with IVI system 102 and simulates the appearance of the user interface associated with IVI system 102.

A driver approval manager 314 requests approval, from the vehicle's driver, of a change to the IVI system 102 entered by a user via a mobile device. For example, if the user has entered a change to the climate control settings of IVI system 102, driver approval manager 314 may request approval from the driver before implementing the climate control change. The requested approval from the driver may be a visual or audible request. In some embodiments, when a user requests a change to a setting in IVI system 102, driver approval manager 314 presents a simple message on a display screen of IVI system 102 asking the driver to touch a button on the display screen (or speak a particular command) to approve the requested change. A request manager 316 performs various tasks associated with implementing a user's request to change a setting in IVI system 102. For example, request manager 316 can manage a change to a setting in IVI system 102 requested by a user and approved by the driver.

Figure 4:
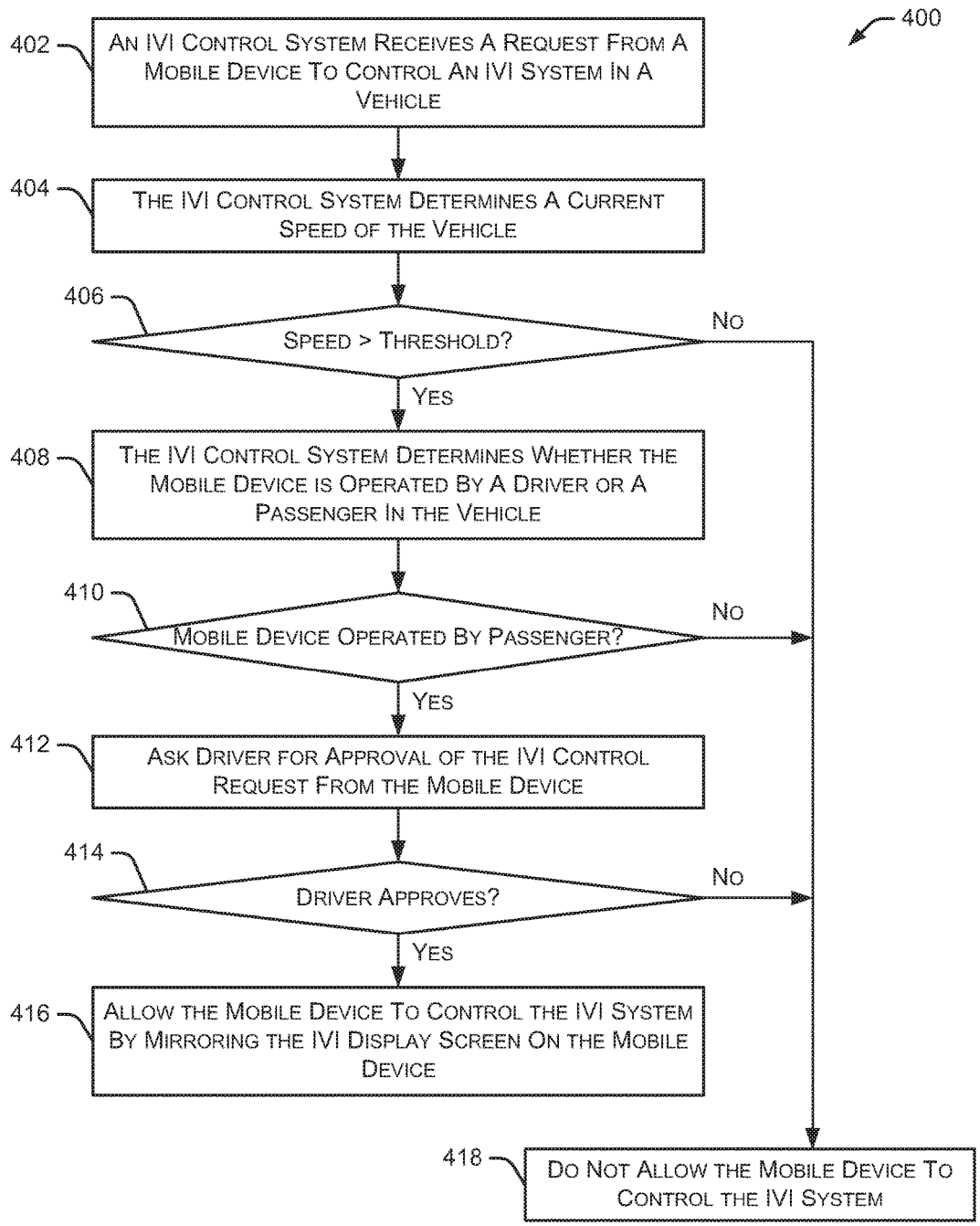
FIG. 4 illustrates an embodiment of a method for determining whether a mobile device can control an in-vehicle infotainment system.

FIG. 4 illustrates an embodiment of a method 400 for determining whether a mobile device can control an in-vehicle infotainment system. Initially, an IVI control system receives 402 a request from a mobile device to control an IVI system in a vehicle. The IVI control system then determines 404 a current speed of the vehicle. In some vehicles, a driver of the vehicle is prevented from operating the vehicle's IVI system when the vehicle is traveling above a particular speed (e.g., above 5 mph). This restriction prevents the driver from operating the IVI system when they should be focused on driving the vehicle.

If, at 406, the speed of the vehicle is not above a threshold value, method 400 does not allow 418 the mobile device to control the IVI system. In this situation, the vehicle is not moving (or is moving at a very slow speed) and the driver remains in control of the IVI system. In some embodiments, the driver may permit access to the IVI system by a mobile device even when the vehicle is moving below the threshold speed.

If, at 406, the speed of the vehicle exceeds the threshold value, method 400 continues as the IVI control system determines 408 whether the mobile device is operated by a driver or a passenger in the vehicle. As noted above, a driver may be restricted from operating the IVI system when the vehicle is moving faster than the threshold speed. This restriction also prevents the driver from operating a mobile device that is controlling (or requesting control of) the IVI system. Method 400 determines whether the mobile device is operated by a driver or passenger based on the location of the mobile device within the vehicle. If the mobile device is located in the driver's location, then the mobile device is considered to be operated by the driver. However, if the mobile device is located in a passenger location of the vehicle, the mobile device is considered to be operated by a passenger. If, at 410, the mobile device is not being operated by a passenger (i.e., operated by the driver), method 400 does not allow 418 the mobile device to control the IVI system.

If, at 410, the mobile device is being operated by a passenger, the IVI control system asks 412 for approval of the IVI control request from the mobile device. In some embodiments, the driver is asked for approval using an audible or visual message or notification. For example, an audible message may ask the driver to approve a proposed change to the vehicle's IVI system. The driver may respond to the audible message by speaking a confirmation response, such as "Yes" or "Approved." Alternatively, a visual message may be displayed on a display screen of the IVI system requesting the driver's approval of the proposed change to the vehicle's IVI system. The driver may respond to the visual message by touching an "Approve" or "OK" button on the display screen of the IVI system or speaking an audible confirmation response.

If, at 414, the driver does not approve the IVI control request from the mobile device, method 400 does not allow 418 the mobile device to control the IVI system. However, if the driver approves, at 414, the IVI control request from the mobile device, the mobile device is allowed to control the IVI system by mirroring 416 the IVI display screen on the mobile device. For example, the current display on the IVI system may be mirrored (i.e., copied) on the mobile device display such that a user of the mobile device can interact with the IVI system using the mirrored data on the mobile device display. When the user presses a button on the mirrored display, a corresponding input is communicated to the IVI system for implementation by the IVI system. As discussed herein, changes implemented using the mobile device may require driver approval. In that situation, the IVI system may receive the proposed changes from the mobile device, but delay implementing the changes until the driver has approved the proposed changes, as discussed herein.

In some embodiments, passenger-specific settings (such as passenger climate control settings or passenger music changes) do not require driver approval. In these embodiments, passenger-specific setting changes are entered by the passenger via the mobile device. The mobile device communicates the changes to the IVI system, which enters the passenger's changes without initiating any driver approval.

In other embodiments, certain driver-specific settings cannot be changed by a passenger. For example, driver's seat settings (heat, cool, and seat position), heated steering wheel settings, heated mirror settings, and the like cannot be changed by a passenger. In particular implementations, these driver-specific settings are not presented on the mobile device display so they are not available for selection or adjustment by the mobile device user.

In a particular example, a passenger in a moving vehicle may want to enter an address associated with a desired destination into the vehicle's IVI system. The vehicle is moving at a significant speed, so the driver is not permitted to access the IVI system to enter the address. The passenger uses a mobile device with an app that communicates with the IVI system. Using the app on the mobile device, the user enters the desired destination address into a navigation portion of the app and submits the proposed address to the IVI system. The IVI system detects that the vehicle is in motion and determines that the requested change in the IVI system was received from a mobile device operated by a passenger. Thus, the IVI system requests approval of the change from the driver of the vehicle, as discussed herein. If the driver approves the change, the IVI system provides the destination address to a navigation portion of the IVI system such that the navigation portion can determine a route to the destination address. A similar approach is used for making other changes to the IVI system, such as sound system changes, climate control changes, entertainment system changes, communication changes, and the like.

Figure 5:
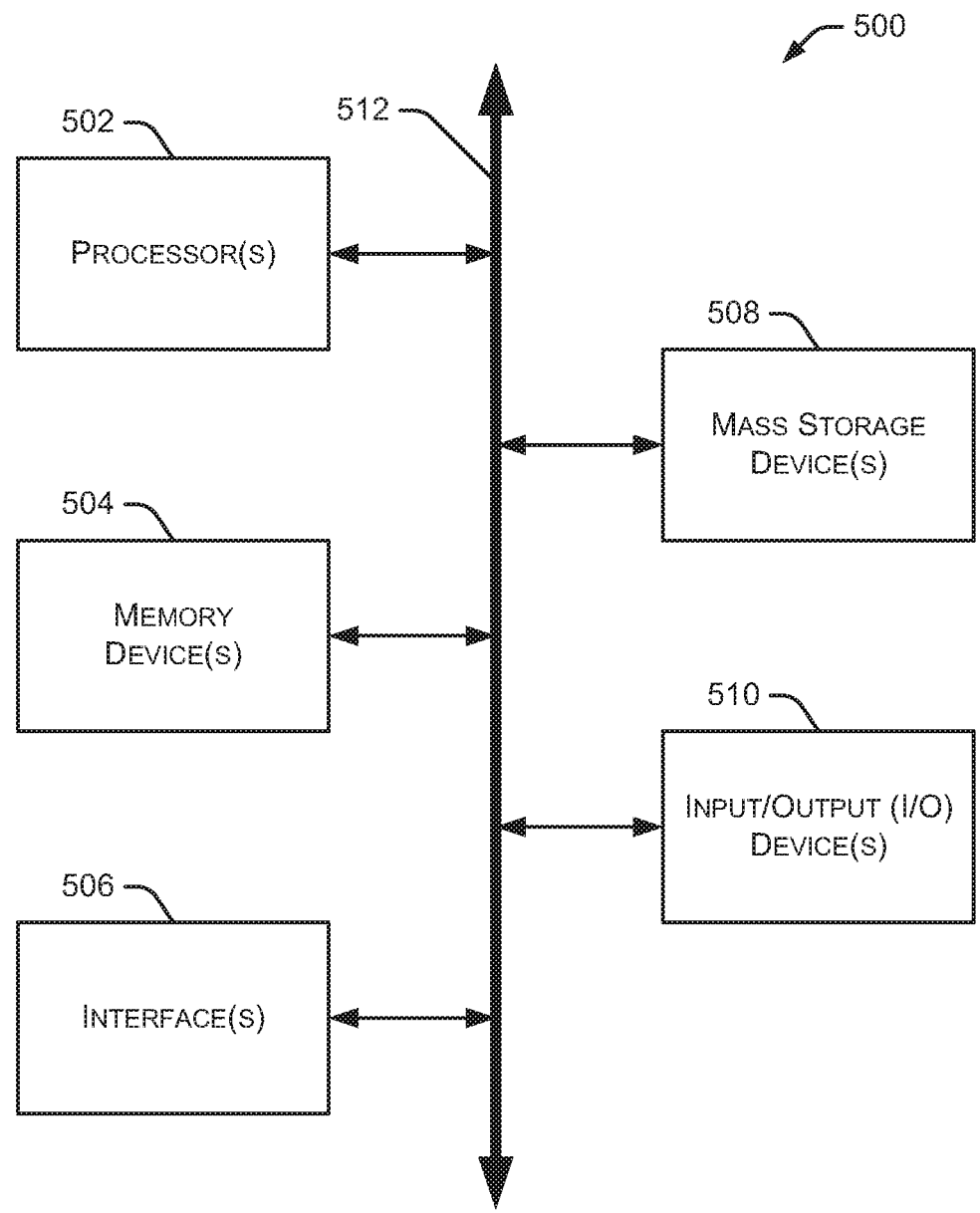
FIG. 5 is a block diagram depicting an embodiment of a computing device.

FIG. 5 is a block diagram depicting an example computing device 500. Computing device 500 may be used to perform various procedures, such as those discussed herein. Computing device 500 can function as a server, a client, an IVI system, or any other computing entity. Computing device 500 can be any of a wide variety of computing devices, such as a desktop computer, a notebook computer, a laptop computer, a server computer, a handheld computer, a tablet, a mobile device, and the like.

Computing device 500 includes one or more processor(s) 502, one or more memory device(s) 504, one or more interface(s) 506, one or more mass storage device(s) 508, and one or more Input/Output (I/O) device(s) 510, all of which are coupled to a bus 512. Processor(s) 502 include one or more processors or controllers that execute instructions stored in memory device(s) 504 and/or mass storage device(s) 508. Processor(s) 502 may also include various types of computer-readable media, such as cache memory.

Memory device(s) 504 include various computer-readable media, such as volatile memory (e.g., random access memory (RAM)) and/or nonvolatile memory (e.g., read-only memory (ROM)). Memory device(s) 504 may also include rewritable ROM, such as Flash memory.

Mass storage device(s) 508 include various computer readable media, such as magnetic tapes, magnetic disks, optical disks, solid state memory (e.g., Flash memory), and so forth. Various drives may also be included in mass storage device(s) 508 to enable reading from and/or writing to the various computer readable media. Mass storage device(s) 508 include removable media and/or non-removable media.

I/O device(s) 510 include various devices that allow data and/or other information to be input to or retrieved from computing device 500. Example I/O device(s) 510 include cursor control devices, keyboards, keypads, microphones, monitors or other display devices, speakers, printers, network interface cards, modems, lenses, CCDs or other image capture devices, and the like.

Interface(s) 506 include various interfaces that allow computing device 500 to interact with other systems, devices, or computing environments. Example interface(s) 506 include any number of different network interfaces, such as interfaces to local area networks (LANs), wide area networks (WANs), wireless networks, CAN bus, and the Internet.

Bus 512 allows processor(s) 502, memory device(s) 504, interface(s) 506, mass storage device(s) 508, and I/O device(s) 510 to communicate with one another, as well as other devices or components coupled to bus 512. Bus 512 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 500, and are executed by processor(s) 502. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. A method comprising:
   receiving a request, from a mobile device, to control an in-vehicle infotainment (IVI) system of a vehicle;
   determining whether a speed of the vehicle exceeds a threshold;
   determining whether the mobile device is operated by a passenger of the vehicle; and
   responsive to determining that the vehicle's speed exceeds the threshold and the mobile device is operated by a passenger, allowing the mobile device to control the IVI system;
   wherein determining whether the mobile device is operated by the passenger of the vehicle comprises:
   sending different audio signals from speakers of the vehicle;
   determining, from the audio signals as received by the mobile device, a location of the mobile device; and
   determining whether the location of the mobile device corresponds to a passenger seat location.

2. The method of claim 1, wherein allowing the mobile device to control the IVI system includes receiving approval from a driver of the vehicle before implementing a proposed control of the IVI system.

3. The method of claim 2, wherein receiving approval from the driver of the vehicle includes receiving an audible approval.

4. The method of claim 2, wherein receiving approval from the driver of the vehicle includes receiving a physical input to a display screen associated with the IVI system.

5. The method of claim 1, wherein allowing the mobile device to control the IVI system includes:
   receiving, from the mobile device, a proposed control of the IVI system;
   requesting approval of the proposed control of the IVI system from a driver of the vehicle; and
   implementing the proposed control of the IVI system responsive to receiving approval from the driver of the vehicle.

6. The method of claim 1, wherein determining whether the speed of the vehicle exceeds a threshold includes receiving a current vehicle speed from a CAN bus.

7. The method of claim 1, wherein controlling the IVI system of the vehicle includes mirroring the IVI system controls on the mobile device.

8. The method of claim 1, further comprising preventing the mobile device from controlling the IVI system if the mobile device is not operated by a passenger.

9. A method comprising:
   receiving a request, from a mobile device, to control an in-vehicle infotainment (IVI) system of a vehicle;
   determining whether a speed of the vehicle exceeds a threshold;
   determining a location of the mobile device within the vehicle; and
   responsive to determining that the vehicle's speed exceeds the threshold and the mobile device is located in a passenger seating area of the vehicle:
   receiving, from the mobile device, a proposed control of the IVI system;
   requesting approval of the proposed control of the IVI system from a driver of the vehicle; and
   implementing the proposed control of the IVI system responsive to receiving approval from the driver of the vehicle
   wherein determining the location of the mobile device within the vehicle comprises:
   sending different audio signals from speakers of the vehicle;
   determining, from the audio signals as received by the mobile device, a location of the mobile device; and
   determining whether the location of the mobile device corresponds to a passenger seat location.

10. The method of claim 9, wherein receiving approval from the driver of the vehicle includes receiving an audible approval.

11. The method of claim 9, wherein receiving approval from the driver of the vehicle includes receiving a physical input to a display screen associated with the IVI system.

12. The method of claim 9, wherein determining whether the speed of the vehicle exceeds a threshold includes receiving a current vehicle speed from a CAN bus.

13. The method of claim 9, further comprising allowing the mobile device to control the IVI system of the vehicle by mirroring the IVI system controls on the mobile device.

14. The method of claim 13, further comprising preventing the mobile device from controlling the IVI system if the mobile device is not located in a passenger seating area of the vehicle.

15. An apparatus comprising:
   a communication manager configured to receive a request, from a mobile device, to control an in-vehicle infotainment (IVI) system of a vehicle;
   a vehicle data processing module configured to receive data associated with a speed of the vehicle and determine whether the speed of the vehicle exceeds a threshold;
   a location identification module configured to determine whether the mobile device is operated by a passenger of the vehicle by:
   sending different audio signals from speakers of the vehicle;
   determining, from the audio signals as received by the mobile device, a location of the mobile device; and
   determining whether the location of the mobile device corresponds to a passenger seat location; and
   a driver approval manager configured to receive, from the mobile device, a proposed control of the IVI system and request approval from a driver of the vehicle if the vehicle's speed exceeds the threshold and the mobile device is operated by a passenger of the vehicle.

16. The apparatus of claim 15, wherein the driver approval manager is further configured to receive a response from the driver regarding whether to implement the proposed control of the IVI system.

17. The apparatus of claim 15, further comprising a data mirroring module configured to mirror the IVI system controls on the mobile device.

18. The apparatus of claim 15, wherein the driver approval manager is further configured to prevent the device from controlling the IVI system if the mobile device is not operated by a passenger of the vehicle.

* * * * *